S. D. CARRIS.
Garden-Rake.
No. 210,450. Patented Dec. 3, 1878.
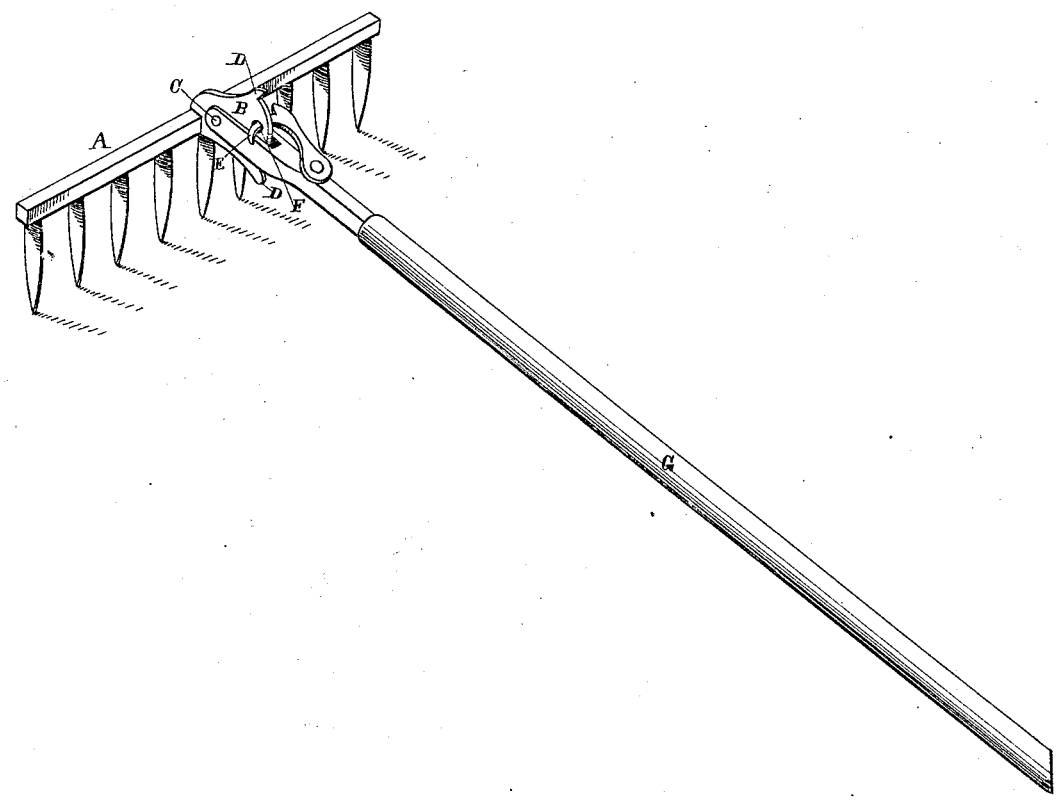
Witnesses
Geo. H. Strong.
Frank A. Brooks
Inventor
Seth D. Carris
by Dewey & Co.
Atty

UNITED STATES PATENT OFFICE.

SETH D. CARRIS, OF KEOTA, IOWA.

IMPROVEMENT IN GARDEN-RAKES.

Specification forming part of Letters Patent No. 210,450, dated December 3, 1878; application filed June 27, 1878.

*To all whom it may concern:*

Be it known that I, SETH D. CARRIS, of Keota, Keokuk county, State of Iowa, have invented an Improved Garden-Rake; and I do hereby declare the following to be a full, clear, and exact description thereof, reference being had to the accompanying drawings.

My invention relates to an improved construction of garden-rakes, by which I am enabled to swivel or hinge the head, that its angle may be changed with reference to the handle at each forward and backward movement of the rake over the ground.

It consists in pivoting the rake head and teeth to the handle by means of a plate provided with stops, so that the teeth may move a certain distance each way in a vertical plane, so as to exert a downward pressure on lumps or clods in whichever direction the rake is moved.

In ordinary garden-rakes, when it is desired to break up lumps or clods, to do which it is necessary to hold the rake so that the teeth are at an angle to the ground, the operation can only be performed by pushing the rake from the operator, lifting it out of the ground and repeating the push. If the rake is drawn back over the ground it simply draws the clods back in a bunch, but does not break them, since the teeth are then at an angle to raise the clods out of the surface, but not to break them. In my improved rake I arrange the rake head and teeth so that they are on a swivel when it is desired to break up clods or lumps, and so that the teeth will incline at the proper angle from the handle, whether they are pushed from or drawn toward the operator.

Referring to the accompanying drawings, let A represent the rake-head, holding the teeth in the usual manner. In the center of this rake-head A is attached a peculiarly-shaped plate, B, set vertically, and held in the slot in the handle G by means of the pin C, as shown. The rake-head is then pivoted to the handle by means of the plate B and pin C, so that when the plate moves in the slot in the handle the rake head and teeth will stand at different angles. Points or lugs D on either side of the plate B prevent the plate sliding too far either way by coming in contact with the handle. A hook or catch, E, on the handle engages with a hole, F, in the rear end of the plate B when it is desired to hold the rake-teeth firmly in the usual position relative to the handle. This hook is engaged with the plate when the rake is to be used for ordinary purposes. When, however, it is desired to break up lumps or clods, the hook is disengaged, and the plate is free to swing on its pivot in a vertical plane, so far as the lugs or points will permit it. The rake can then be used for breaking up lumps or clods, as the teeth have a downward pressure, whether drawn toward or pushed from the operator. As the lower end of the teeth are on the ground, as the rake is pushed over the ground forward and backward they alter their angle, so as to have a downward pressure at each motion of the rake. By this means they have a harrow-like action when moved in either direction, while with ordinary rakes this action is only possible when the rake is pushed away from the operator.

Having thus described my invention, what I claim as new, and desire to secure by Letters Patent, is—

The rake-head A, with its plate B, by which it is pivoted to the slotted handle, so as to change its angle with the handle, as shown, said plate having the lugs or stops D at each side, to limit the alternate movements of the head to an acute angle and obtuse angle to the handle as the rake is drawn over the ground, substantially as herein described.

In witness whereof I hereunto set my hand and seal.

SETH D. CARRIS. [L. S.]

Witnesses:
J. W. MORTON,
CYRUS BEARD.